United States Patent [19]

Tibbitts

[11] 4,025,048
[45] May 24, 1977

[54] CRANKCASE DRAIN ASSEMBLY

[76] Inventor: Harry E. Tibbitts, Rte. 1, Coal City, Ill. 60416

[22] Filed: Dec. 10, 1975

[21] Appl. No.: 639,309

[52] U.S. Cl. .............................. 251/144; 137/572; 251/340; 222/525; 184/1.5

[51] Int. Cl.² ........................................ F16N 1/00

[58] Field of Search .......... 137/572; 222/519, 520, 222/525; 251/340, 144; 184/1.5

[56] References Cited

UNITED STATES PATENTS

| 359,305 | 3/1887 | Wirz | 222/520 |
|---|---|---|---|
| 2,325,325 | 7/1943 | Kiene | 251/340 |
| 2,343,134 | 2/1944 | Cawood | 251/340 |
| 2,796,881 | 6/1957 | Schweir | 251/215 |
| 2,841,175 | 7/1958 | Ford | 251/340 |
| 3,659,632 | 5/1972 | Jonsson | 251/215 |
| 3,677,369 | 7/1972 | Schramm | 184/1.5 |
| 3,727,638 | 4/1973 | Zaremba et al. | 137/572 |
| 3,806,085 | 3/1973 | Codo | 251/144 |
| 3,856,262 | 12/1974 | Jordan | 251/340 |
| 3,869,391 | 4/1974 | Kramer | 184/1.5 |
| 3,874,478 | 4/1975 | Mantell | 251/144 |
| 3,929,264 | 12/1975 | Maynard, Jr. | 222/525 |
| 3,948,481 | 4/1976 | Pollock | 251/144 |
| 3,954,250 | 5/1976 | Grace | 251/144 |

Primary Examiner—William R. Cline
Assistant Examiner—H. Jay Spiegel
Attorney, Agent, or Firm—Ernest Kettelson

[57] ABSTRACT

A crankcase drain assembly comprising a manually operated valve unit mounted in the crankcase drain opening and a disposable container of flexible sheet material connected to the valve unit by a flexible hose member. The valve unit includes a large diameter planetary knob to facilitate manual opening and closing of the drain valve and eliminate the need for separate tools. The valve unit also includes a concave inlet port for seating in the drain opening so its rim area extends no further than level with the crankcase floor, thereby enabling the used crankcase oil to drain completely.

1 Claim, 8 Drawing Figures

CRANKCASE DRAIN ASSEMBLY

BACKGROUND OF THE DISCLOSURE

This invention relates to the field of crankcase oil drain assemblies for the do-it-yourself market, and includes a disposable container in which to drain the oil plus a drain valve unit and a connecting hose.

A prior device of this type is disclosed in U.S. Pat. No. 3,727,638 issued to John P. Zaremba, Jr. et al., Apr. 17, 1973. In crankcase oil drain assemblies of this type, the original drain plug must be replaced with one having valve means and a connecting spout to which a flexible hose can be connected to carry the oil into the disposable container. One of the problems in replacing the original drain plug with a plug having valve means is being able to close the valve tightly enough to prevent any oil leakage and securely enough to prevent the valve from working loose as a result of vibrations occuring from movement of the vehicle.

The valve unit in U.S. Pat. No. 3,727,638 deals with this problem by providing a valve housing threadedly mounted in the crankcase opening, then using a threaded valve stem engaging the internally threaded wall of a central bore through the valve housing, the stem being rotatable by means of a wrench to open and close the valve.

Since this type of oil drain assembly is intended for the do-it-yourself market, the need for a particular type of wrench is an inconvenience. Furthermore, if one tries to use an adjustable wrench, there is a danger that the wrench would inadvertently engage the nut of the valve housing which lies closely adjacent to the nut of the threaded valve stem. Before realizing the mistake, one could break loose the valve housing which is supposed to be tightly screwed into the drain opening. If this happens inadvertently, the valve housing could later work its way completely out of the drain opening through vibrations while the vehicle is moving causing loss of the engine oil.

It is therefore desirable to provide a valve unit which may be operated between securely closed and fully open positions entirely by hand. This prevents inadvertently loosening the wrench tightened valve housing.

Another disadvantage of valve units of the type disclosed in U.S. Pat. No. 3,727,638 is that the inlet port of the valve housing tapers upward in a frusto-conical outer configuration. If the threaded walls of the tubular valve housing fully engages the corresponding internally threaded wall of the crankcase drain opening, which it must to be securely fastened, the upwardly tapered inlet port will protrude upwardly from the crankcase floor a certain distance. With such units, it is impossible to drain all of the old crankcase oil out of the crankcase. The most heavily contaminated oil also lies on the bottom of the crankcase floor, and it is this oil which such prior art units are unable to remove.

It is therefore desirable to provide a valve unit in a crankcase drain assembly which has a concave or inwardly tapered inlet port, and which also provides a valve housing with a threaded outer wall which can be fully engaged throughout the entire span of the corresponding internally threaded wall of the crankcase drain opening without protruding into the crankcase cavity above the level of the crankcase floor.

SUMMARY OF THE INVENTION

It is an object of the invention to provide a crankcase drain assembly comprising a manually operated valve unit mounted in the crankcase drain opening and a disposable container connected to the drain unit in which to drain the used crankcase oil.

It is an object of the invention to provide a crankcase drain assembly which may be operated by hand without the need for any tool and which completely drains the used contaminated oil from the crankcase.

It is an object of the invention to provide a crankcase drain assembly having a valve unit in which the inlet port is inwardly concave.

It is an object of the invention to provide a crankcase drain assembly having a valve unit, and including a large diameter planetary knob to operate a threaded rotatable valve stem between open and closed positions.

DESCRIPTION OF PREFERRED EMBODIMENT

Figure 1:
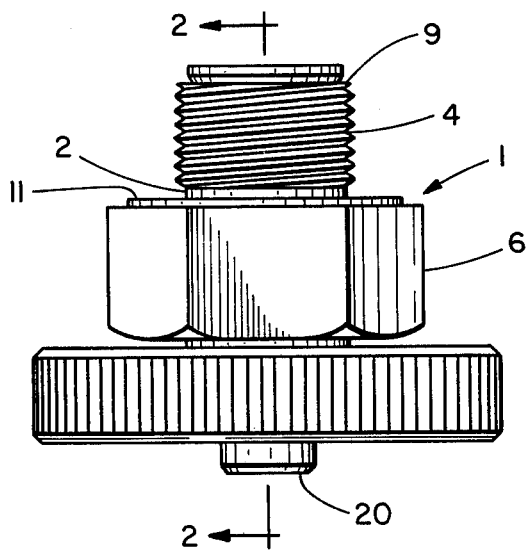
FIG. 1 is an elevation view of a valve unit for a crankcase drain assembly in accordance with this invention, shown in the closed position.
Figure 2:
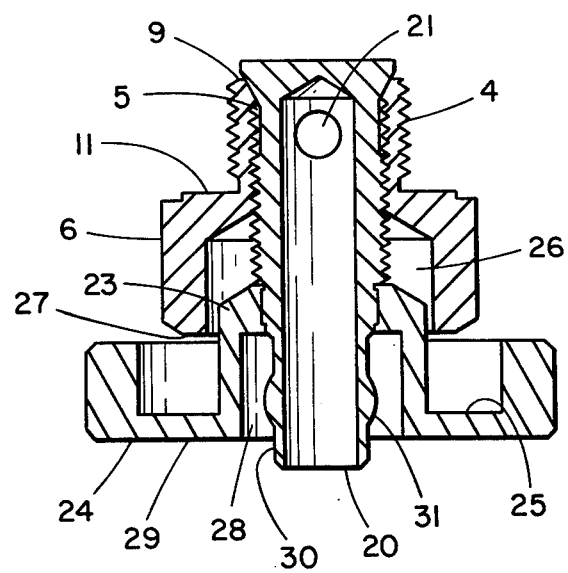
FIG. 2 is a section view taken on line 2—2 of FIG. 1.
Figure 3:
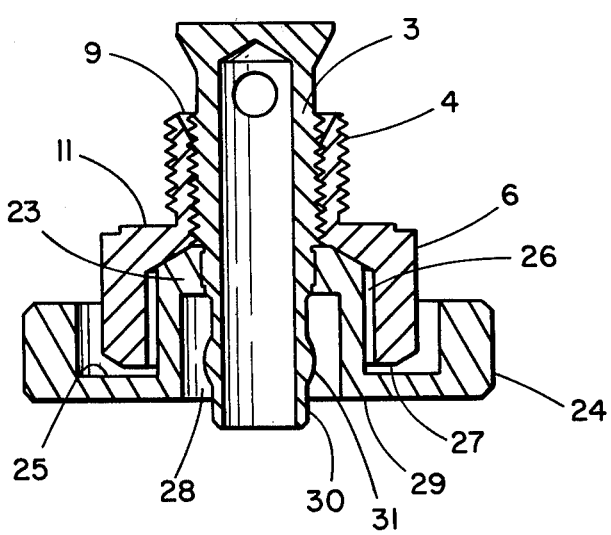
FIG. 3 is a section view taken on line 2—2 of FIG. 1, showing the valve unit in opened position.
Figure 4:
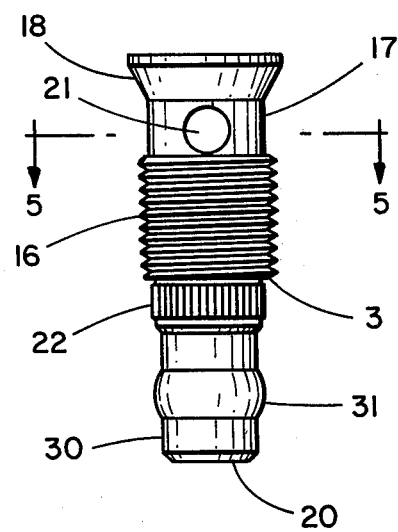
FIG. 4 is an elevation view of the valve stem of the valve unit in FIG. 1.
Figure 5:
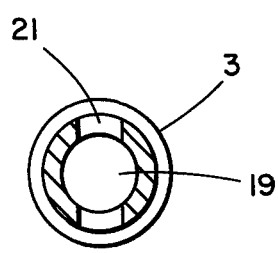
FIG. 5 is a section view taken on line 5—5 of FIG. 4.
Figure 6:
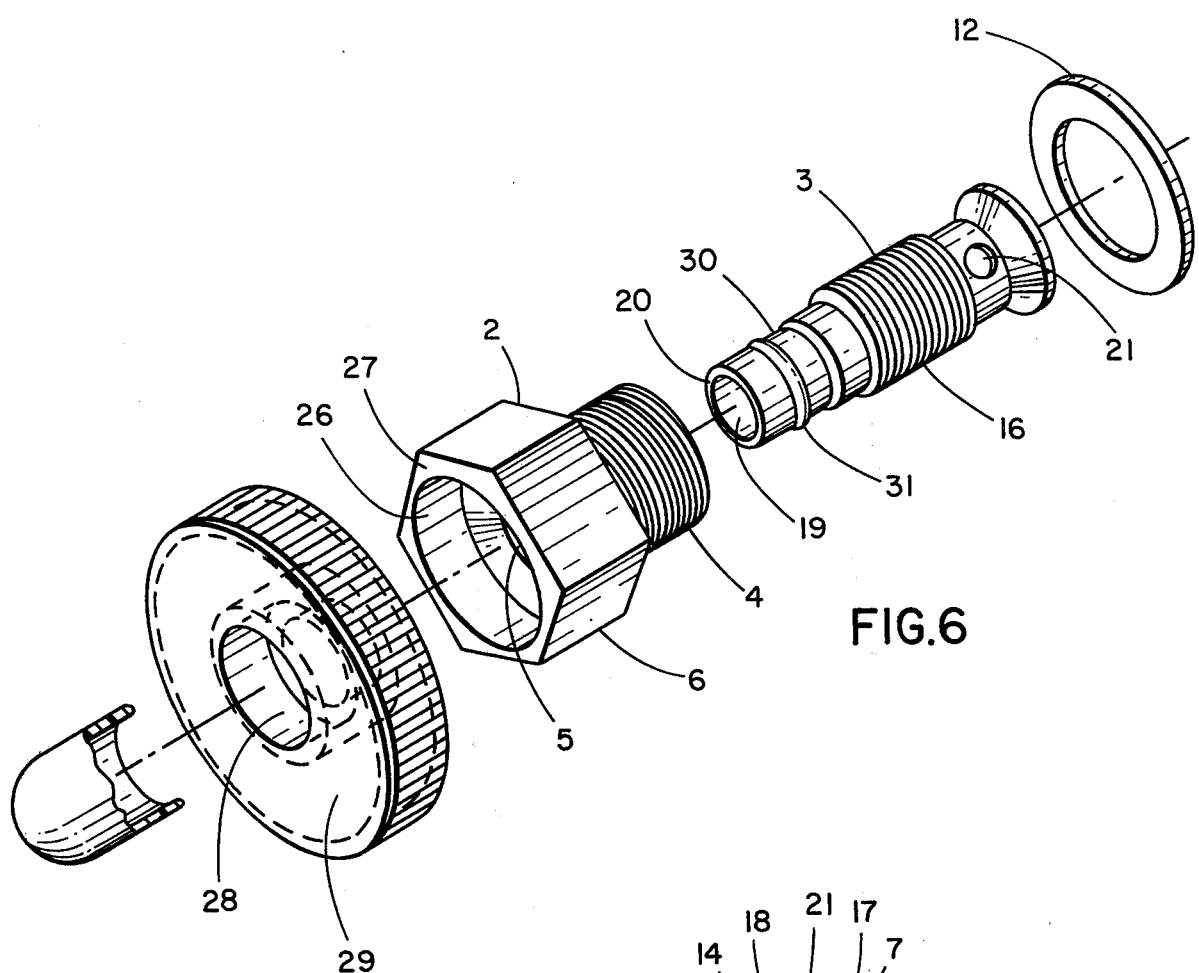
FIG. 6 is an exploded perspective view of the valve unit in accordance with this invention.
Figure 7:
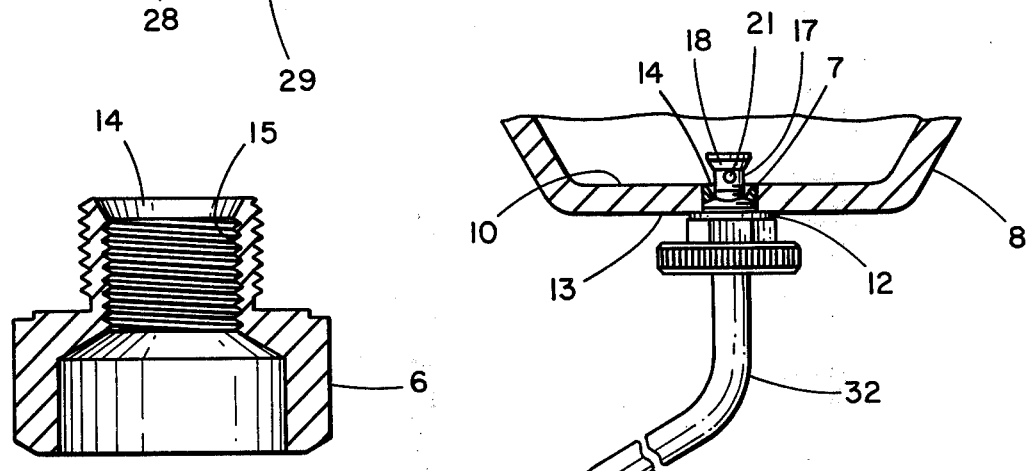
FIG. 7 is an elevation view of the entire crankcase drain assembly, and a section view of a fragment of a motor vehicle crankcase, with the valve housing shown fully seated in the crankcase drain opening and with the valve stem in open position.
Figure 8:
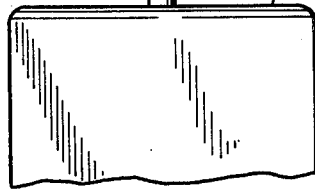
FIG. 8 is a section view taken on line 2—2 of FIG. 1 showing the valve housing and tapered entrance port.

In accordance with this invention, a manually operated valve assembly 1, having a valve housing 2 and a valve stem 3, replaces the original crankcase drain plug of a motor vehicle. The valve housing 2 comprises an externally threaded cylindrical shank 4 with a central bore 5 extending completely through, and an integral nut 6 formed at one end. The diameter of the shank 4 and its threads corresponds to that of the original drain plug so the shank may be screwed into opening 7 of the crankcase 8. The nut 6 is shaped and dimensioned to be tightened by a wrench or other tool. An appropriate size nut 6 for example may have a diameter of approximately three-fourths inch to accept a three-fourths inch end wrench.

The length of the threaded shank is such that its upper rim end 9 is flush with the inside bottom surface 10 of the crankcase 8 when the abutting surface 11 of integral nut 6, with the sealing washer 12 mounted thereon, reaches bearing engagement against the outer wall 13 of the crankcase 8.

The upper rim end 9 of the shank 4 has a tapering entrance segment 14, tapering inwardly from the rim end 9 and downwardly a short distance to the junction with central bore 5.

With this structure, of a shank whose upper rim end is flush with the inside bottom surface of the crankcase, and an inwardly-downwardly tapering entrance to the central outlet bore, the entire contents of the crankcase can be drained.

The internal cylindrical wall 15 of the shank 4 is also threaded, but with so called "left-hand" threads. The internal threads are directed to receive a corresponding externally threaded shank for movement inward upon rotating the shank counter-clockwise.

The vave stem 3 includes an externally threaded shank 16 whose threads are directed to correspond and cooperate with the internally threaded wall 15 of the shank 4 of the valve housing 2. The valve stem 3 also includes a neck 17 extending from the upper end of the threaded shank 16 to a tapered head 18. The tapered head 18 is shaped and dimensioned to seat in the tapered entrance segment 14 of the shank 4 of the valve housing 2 when the valve stem 3 is rotated to its fully closed position, thereby sealing the entrance to central bore 5 against any leakage of oil from the crankcase.

The valve stem 3 includes a central bore 19 having a discharge opening 20 at one end, and opening at the other end to a radial bore 21 extending through the neck 17. When the valve stem 3 is in fully closed position, the neck 17 is drawn into the interior of the valve housing shank 4 and the openings to the radial bore 21 are thereby completely covered. When the valve stem 3 is rotated to its open position, the neck 17 extends outward beyond the tapered entrance segment 14 of the valve housing shank 4 and eventually beyond the upper rim end 9 of the shank 4 into the crankcase cavity, thereby exposing the openings to the radial bore 21 which enables the crankcase oil to flow into radial bore 21, into central bore 19 and out the discharge opening 20.

Adjacent the lower end of the threaded shank 16, the valve stem 3 has a knurled annular collar 22 integrally formed thereon to receive the hub 23 of the relatively large diameter planetary knob 24 in a tight press fit. The diameter of the planetary knob 24 is substantially larger than that of the nut 6, so the knob 24 may be tightened and loosened manually whereas the nut 6 must be tightened and loosened by means of a wrench or othertool. When the diameter of the nut 6 is three-fourths inch, the diameter of the knob 24 would be approximately 1¼ inches. The relationship between the tool operable nut 6 and the manually operable knob 24 is such that the diameter of the nut is at least 60 percent smaller than that of the knob 24, or conversely the diameter of the knob 24 is at least 1.67 times larger than that of the nut 6.

The hub 23 projects axially from the inward facing surface 25 of the knob 24 for cooperative movement into and out of a corresponding recess 26 formed in the outwardly directed end 27 of the valve housing nut 6. When the valve stem 3 is in fully open position, hub 23 is seated within recess 26 in bearing relationship against the valve housing nut 6 to block further movement of the valve stem 3 in the opening direction.

The opposite side of knob 24 includes a counter-sunk annular recess 28 extending inwardly from the outwardly facing surface 29 of the knob 24. The valve stem 3 includes a discharge spout 30 extending from the knurled collar 22, and a raised annular rib 31 is formed around a median portion ofthe discharge spout 30 to engage and hold a resilient flexible tube 32 when the discharge spout 30 is inserted into an end thereof.

The resilient tube 32 leads to a container 33, which is preferably a disposable container of plastic or the like which must be impermeable to liquids.

In operation, the manually operated valve assembly 1 is screwed into the discharge opening 7 of the crankcase 8, replacing the original drain plug. A wrench is used on the nut 6 to wrench tighten the valve housing 2 in the discharge opening 7. When fully tightened, the upper rim end 9 of the valve housing is flush with the inside bottom surface of the crankcase.

The large diameter planetary knob 24 is then rotated in a clockwise direction, i.e. clockwise when viewed from a position axially outward from the knob, until the valve stem 3 is in its fully closed position with the tapered head 18 firmly seated in tapered entrance segment 14 of the valve housing shank 4. The crankcase may now be filled with oil.

To drain the crankcase, the large diameter knob 24 is rotated in the opposite or counter-clockwise direction which moves the valve stem 3 to the open position, with the neck 17 extending outwardly from the central bore 5, the tapered entrance segment 14 and above the rim end 9 of the valve housing, thus exposing the openings to radial bore 21. The crankcase oil can now enter the bore 21, flow into the central bore 19 of the stem, through discharge opening 20, into flexible tube 32 connected to the unit and ultimately into the container 33.

When fully drained, the flexible tube 32 is removed and the large diameter knob 24 is then rotated clockwise to move the valve stem 3 to closed position and tightened manually. The crankcase may then be refilled with clean fresh oil.

I claim:

1. A crankcase drain assembly comprising manually operable valve means for mounting in the drain opening of a crankcase, including a body portion for mounting in said drain opening, a central bore through said body portion having an inlet opening comprising an inwardly tapering entrance region, said central bore of said body portion being internally threaded, a valve stem having an externally threaded shank mounted in said central bore of said body portion for cooperative threaded engagement therewith and for movement between an open and closed position upon rotation of said valve stem therein, said valve stem including a tapered head being tapered and dimensioned to seat in said inwardly tapering entrance region of said body portion when said valve stem is in said closed position, a central bore in said valve stem extending from a discharge aperture at the discharge end of said valve stem, inlet means extending through said valve stem opening to its said central bore for communication between the interior of said crankcase and said central bore when said valve stem is in said open position, said valve stem including a discharge spout at said discharge end thereof, said body portion of said valve means including an outwardly directed end portion thereof projecting outwardly from said crankcase when said body portion is mounted therein, a hub-receiving recess formed in said outwardly directed end portion of said body portion, a knob secured to said discharge end of said valve stem for rotation thereof, said knob having a radially projecting portion and an inwardly projecting hub, said inwardly projected hub being receivable in said hub-receiving recess of said body portion when said valve stem is rotated to said open position, a central bore through said hub to receive said discharge end of said valve stem there-through for securing said knob to said valve stem, said inwardly projecting hub including a recess extending inwardly from said radially projecting portion of said knob, said discharge spout of said valve stem extending through said recess of said hub and being spaced from the walls thereof to receive a flexible discharge tube thereon, said inwardly projecting hub surrounding and protecting said discharge spout of said valve stem.

* * * * *